(12) United States Patent
Huang et al.

(10) Patent No.: US 12,174,711 B2
(45) Date of Patent: Dec. 24, 2024

(54) METHOD, DEVICE, AND COMPUTER PROGRAM PRODUCT FOR DETERMINING DATA RECOVERY DURATION

(71) Applicant: Dell Products L.P., Round Rock, TX (US)

(72) Inventors: Yina Huang, Shanghai (CN); Sean Liu, Shanghai (CN); Piers Yu, Shanghai (CN); Yunfei Chen, Shanghai (CN); Jianhua Shao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/226,413

(22) Filed: Jul. 26, 2023

(65) Prior Publication Data
US 2024/0241797 A1 Jul. 18, 2024

(30) Foreign Application Priority Data
Jan. 18, 2023 (CN) .......................... 202310086824.4

(51) Int. Cl.
*G06F 16/00* (2019.01)
*G06F 11/14* (2006.01)

(52) U.S. Cl.
CPC ...... *G06F 11/1469* (2013.01); *G06F 2201/84* (2013.01)

(58) Field of Classification Search
CPC .................................................. G06F 16/113
See application file for complete search history.

(56) References Cited

U.S. PATENT DOCUMENTS

| | | | |
|---|---|---|---|
| 6,650,660 B1 | 11/2003 | Koehler et al. | |
| 8,145,603 B2 * | 3/2012 | Yamagami | G06F 11/1471 707/648 |
| 10,498,815 B2 * | 12/2019 | Desai | H04L 43/04 |
| 11,042,503 B1 * | 6/2021 | Vig | G06F 11/1451 |
| 11,609,854 B1 | 3/2023 | Shatsky et al. | |
| 2006/0149798 A1 * | 7/2006 | Yamagami | G06F 11/1469 |
| 2014/0280848 A1 * | 9/2014 | Modh | H04L 47/78 709/223 |
| 2015/0363851 A1 * | 12/2015 | Stella | H04L 67/63 705/26.41 |
| 2018/0060184 A1 * | 3/2018 | Thakkar | G06F 11/1448 |
| 2018/0307562 A1 * | 10/2018 | Xu | G06F 11/1469 |
| 2020/0249029 A1 | 8/2020 | Schmidt et al. | |
| 2020/0319799 A1 * | 10/2020 | Mayer | G06F 3/061 |
| 2020/0410418 A1 * | 12/2020 | Martynov | G06F 16/122 |
| 2022/0141912 A1 | 5/2022 | Grover et al. | |
| 2023/0351224 A1 * | 11/2023 | Igure | G06N 5/04 |

* cited by examiner

*Primary Examiner* — Noosha Arjomandi
(74) *Attorney, Agent, or Firm* — BainwoodHuang

(57) ABSTRACT

Technique for determining a data recovery duration involve determining a plurality of phases of data recovery. Such techniques further involve determining, based on a metadata metric set of a phase in the plurality of phases, a recovery duration of the phase, the recovery duration of the phase representing a duration required for recovery of the phase. Such techniques further involve determining the data recovery duration based on the recovery duration of the phase. Accordingly, a data recovery duration can be accurately predicted, and a user can know in advance how long data unavailability will last, which helps the user make a decision to schedule the data recovery in an appropriate time period, thereby being more effective and efficient for the user.

20 Claims, 7 Drawing Sheets

METHOD, DEVICE, AND COMPUTER PROGRAM PRODUCT FOR DETERMINING DATA RECOVERY DURATION

CROSS-REFERENCE TO RELATED APPLICATION

This application claims priority to Chinese Patent Application No. CN202310086824.4, on file at the China National Intellectual Property Administration (CNIPA), having a filing date of Jan. 18, 2023, and having "METHODS, DEVICES AND COMPUTER PROGRAM PRODUCT FOR DETERMINING ELAPSED TIME FOR DATA RECOVERY" as a title, the contents and teachings of which are herein incorporated by reference in their entirety.

TECHNICAL FIELD

Embodiments of the present disclosure generally relate to the field of data recovery, and more specifically, to a method, a device, and a computer program product for determining a data recovery duration.

BACKGROUND

Data recovery (sometimes referred to as data path recovery) is critical for a storage apparatus (sometimes also referred to as a storage system). When a storage object resource is offline and needs to be repaired, or when an input/output (I/O) error is encountered on some data volumes or some operations, it is necessary to perform data recovery on a storage apparatus in an offline state. A duration of data unavailability is determined by a data recovery duration (that is, an elapsed time of a data recovery process). Therefore, the data recovery duration is of great significance to users. However, there is currently no mechanism or method for predicting an elapsed time of a data recovery process on a specific storage apparatus before data recovery starts. That is, the data recovery duration cannot be predicted.

SUMMARY OF THE INVENTION

Embodiments of the present disclosure provide a method, a device, and a computer program product for determining a data recovery duration.

In one aspect of the present disclosure, a method for determining a data recovery duration is provided. The method includes: determining a plurality of phases of data recovery; determining, based on a metadata metric set of a phase in the plurality of phases, a recovery duration of the phase, the recovery duration of the phase representing a duration required for recovery of the phase; and determining the data recovery duration based on the recovery duration of the phase.

In another aspect of the present disclosure, an electronic device is provided. The device includes a processing unit and a memory, where the memory is coupled to the processing unit and stores instructions. The instructions, when executed by the processing unit, perform the following actions: determining a plurality of phases of data recovery; determining, based on a metadata metric set of a phase in the plurality of phases, a recovery duration of the phase, the recovery duration of the phase representing a duration required for recovery of the phase; and determining the data recovery duration based on the recovery duration of the phase.

In still another aspect of the present disclosure, a computer program product is provided. The computer program product is tangibly stored on a non-transient computer-readable medium and includes computer-executable instructions, wherein the computer-executable instructions, when executed, cause a computer to perform the method or process according to embodiments of the present disclosure.

The Summary of the Invention part is provided to introduce relevant concepts in a simplified manner, which will be further described in the Detailed Description below. The Summary of the Invention part is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
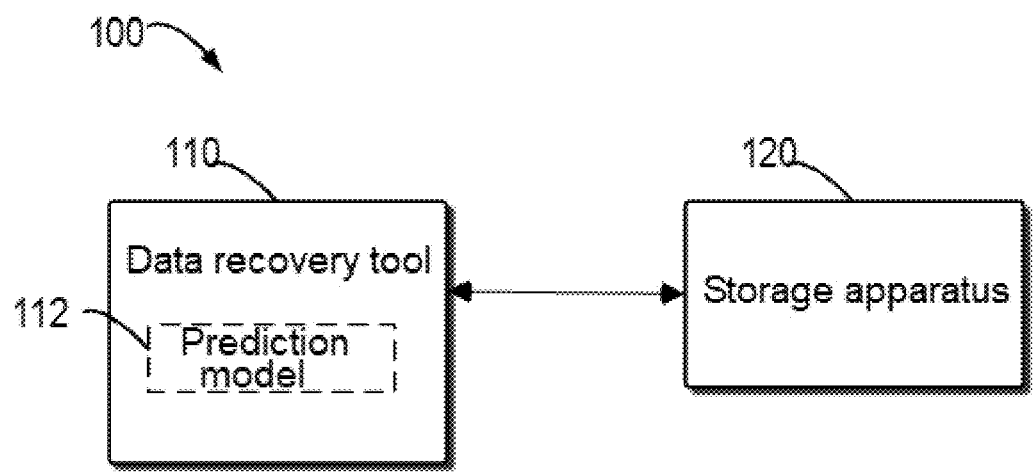
FIG. 1 shows a schematic diagram of an example environment for determining a data recovery duration according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although some embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless it is clearly stated that the terms refer to different objects.

As mentioned before, data recovery is critical for a storage apparatus. When a storage object resource is offline and needs to be repaired, or when I/O errors are encountered on some data volumes or some operations, data recovery needs to be performed. When performing data recovery, the entire device or system including a storage apparatus will usually be offline, and various types of metadata are scanned and browsed to check the consistency. The data recovery process may include a plurality of phases, and each phase of the plurality of phases has a different task and may affect different metadata. Finally, data recovery will ensure that all metadata have been scanned, verified, and kept consistent, and then the storage apparatus will be allowed to return to a normal mode.

As mentioned above, the data recovery is an offline operation. Therefore, the data on the storage apparatus will not be available during the data recovery until the data recovery is completely finished. Obviously, the duration of data unavailability is determined by the data recovery duration. Therefore, the data recovery duration is of great significance to users. If information about how long the data recovery process will take can be obtained before the data recovery process starts, the user may evaluate the impact of the data unavailability period, or plan to perform the data recovery at an appropriate time when it is unnecessary to immediately recover the data.

However, there is currently no mechanism or method for predicting a data recovery duration on a specific storage apparatus before data recovery starts. Therefore, users and engineers have no idea how long the upcoming data recovery will take. During the data recovery, only one progress indicator shows a hard-coded percentage of the completed part of the entire data recovery. Specifically, there are some typical phases in the whole recovery process, and the phases will be started and completed one by one. Each phase has a specified hard-coded percentage. When a phase is completed, the recovery progress indicator will be set to a corresponding hard-coded percentage. However, the progress indicator will only display after the data recovery has started. At this time, because the data recovery has started and cannot be stopped halfway, there is no other way than waiting for the end of the data recovery, even if how long the data recovery will take can be known. Moreover, the hard-coded percentage has no direct or linear relationship with the recovery duration, and it is difficult to accurately estimate the time required to complete the recovery process based on the progress indicator. In addition, a software code logic used for realizing data recovery may be updated in a newly released version, so that it is more difficult to accurately estimate the time required to complete the recovery process because the fixed percentages of the hard codes are "outdated." For example, it is necessary to perform data recovery on a storage system; and at the same time, it is required to use some of the currently intact data on the storage system in 2 days. If the data recovery is started, the progress indicator shows that the data recovery will take 3 days. At this time, because the data recovery has started and cannot be stopped halfway, the data intended to be used can only be used after the data recovery is completed. For another example, it is necessary to perform data recovery on a storage system; and at the same time, it is required to use some of the currently intact data on the storage system in 2 days. If the data recovery is started, the progress indicator implemented by hard coding shows that the data recovery will take 1.5 days, while the prediction of the data recovery duration by the progress indicator is inaccurate. In fact, after 2 days of data recovery, the progress indicator still shows that the data recovery still needs 1 day. In this case, likewise, because the data recovery has started and cannot be stopped halfway, the data intended to be used can only be used after the data recovery is completed. Therefore, according to a conventional design, it is difficult for users and engineers to know how long an upcoming or ongoing recovery process will take, and they cannot evaluate and plan the data recovery in advance, but can only blindly perform data recovery and deal with whatever progress there is.

Therefore, embodiments of the present disclosure provide a method, a device, and a computer program product for determining a data recovery duration before data recovery starts. In this method, a plurality of phases of data recovery are determined first. Then, based on a metadata metric set of a phase in the plurality of phases, a recovery duration of the phase is determined, and the recovery duration of the phase represents the duration required for the recovery of the phase. Then, the data recovery duration is determined based on the recovery duration of the phase. Specifically, in some embodiments, each phase of data recovery is estimated, because different phases are related to different metadata, and the time required for data recovery at different phases may vary greatly. After the estimation of all phases is completed, an estimated value of the data recovery duration corresponding to the whole data recovery process is obtained by adding them together. For each phase or part of the phase of the data recovery, first of all, the metadata metrics most relevant to/important for the data recovery duration are found through online feature extraction. These extracted metadata metrics are used as features in subsequent model training. Then, based on the extracted metadata metrics, a dataset is selected for online training. For example, a group of existing recovery records similar to the data to be estimated or similar in scale as the data to be estimated are selected based on distances, and existing recovery records that are far away are eliminated. Then, using the extracted metadata metrics as features and using the selected existing recovery records as a training dataset, supervised learning is performed to conduct model training, and the recovery duration of the phase with a current data layout is predicted. The "data layout" may be, for example, represented (or reflected) by a group of metadata metrics.

Such technical ideas and methods can ensure that the extracted features and the selected training dataset are suitable for training the recovery duration of the current phase based on the data layout of the current storage apparatus, which will make the subsequent supervised learning more reliable and accurate. In this way, by using the existing recovery records and machine learning, the time required for data recovery to be performed may be estimated based on the data layout in the storage apparatus. By using the present disclosure, a relatively accurate data recovery duration can be estimated before the data recovery starts. In this way, users are enabled to know how long the data unavailability may last, and are assisted in planning an appropriate time period for performing data recovery.

Basic principles and several example implementations of the present disclosure are illustrated below with reference to FIG. 1 to FIG. 7. It should be understood that these example embodiments are given only to enable those skilled in the art to better understand and then implement the embodiments of the present disclosure, and are not intended to limit the scope of the present disclosure in any manner.

FIG. 1 shows a schematic diagram of example environment 100 for determining a data recovery duration according to an embodiment of the present disclosure. As shown in FIG. 1, data recovery tool and storage apparatus 120 may be included in example environment 100. Data recovery tool 110 and storage apparatus 120 may communicate with each other.

In some embodiments, in example environment 100, data recovery tool 110 may be embedded in storage apparatus 120 as a part of the entire storage apparatus 120. In some other embodiments, in example environment 100, data recovery tool 110 is separated from storage apparatus 120. Only when data recovery is required for storage apparatus 120 will data recovery tool 110 be connected to storage apparatus 120 to perform data recovery for storage apparatus 120.

In some embodiments, in example environment 100, data recovery tool 110 may further include prediction model 112. Prediction model 112 is used for estimating an elapsed time required for data recovery of storage apparatus 120, that is, the aforementioned data recovery duration. Prediction model may be a supervised learning model.

Figure 2:
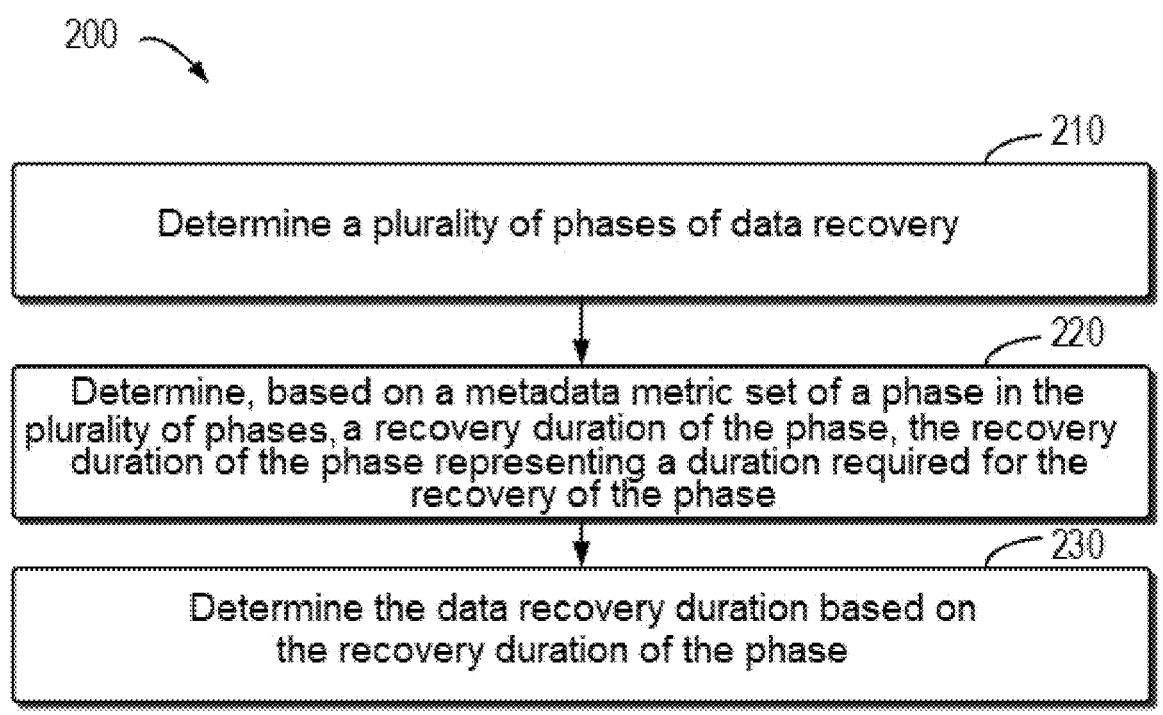
FIG. 2 shows a flow chart of a method for determining a data recovery duration according to an embodiment of the present disclosure.

FIG. 2 shows a flow chart of example method 200 for determining a data recovery duration according to an embodiment of the present disclosure. Example method 200 is illustrated with reference to FIG. 1.

As shown in FIG. 2, in example method 200, in 210, a plurality of phases of a data recovery process are determined. For example, data recovery tool 110 may determine a plurality of phases of the data recovery process, such as phase 1, phase 2, . . . , and phase N shown in FIG. 3, where N is an integer greater than 1.

In 220, based on a metadata metric set of a phase in the plurality of phases, a recovery duration of the phase may be determined. The recovery duration of the phase represents a duration required for the recovery of the phase. For example, data recovery tool 110 may determine the recovery duration of the phase based on the metadata metric set of the phase. Specifically, for example, for each phase of the plurality of phases, data recovery tool 110 may first perform online feature extraction to find a metadata metric most relevant to the data recovery duration (in other words, the most important for data recovery). Next, data recovery tool 110 may select an existing recovery record online as a training dataset for subsequent learning. Then, data recovery tool 110 may perform supervised learning to train a prediction model (for example, prediction model 112 shown in FIG. 1) to predict the recovery duration of the phase. It should be noted that the number of "metadata metrics most relevant to the data recovery duration (in other words, the most important for data recovery)" described here may be multiple, for example, as described in FIG. 3 and FIG. 5 later.

In 230, the data recovery duration may be determined based on the recovery duration of the phase. For example, after obtaining the recovery durations of various phases of the plurality of phases, data recovery tool 110 may determine the data recovery duration corresponding to the entire data recovery process based on the recovery durations of various phases. For example, data recovery tool 110 determines the data recovery duration by adding the recovery durations of various phases.

In this way, according to example method 200, a data recovery duration can be accurately predicted, and a user can know in advance how long data unavailability will last, which helps the user make a decision to schedule the data recovery in an appropriate time period, thereby being more effective and efficient for the user.

Figure 3:
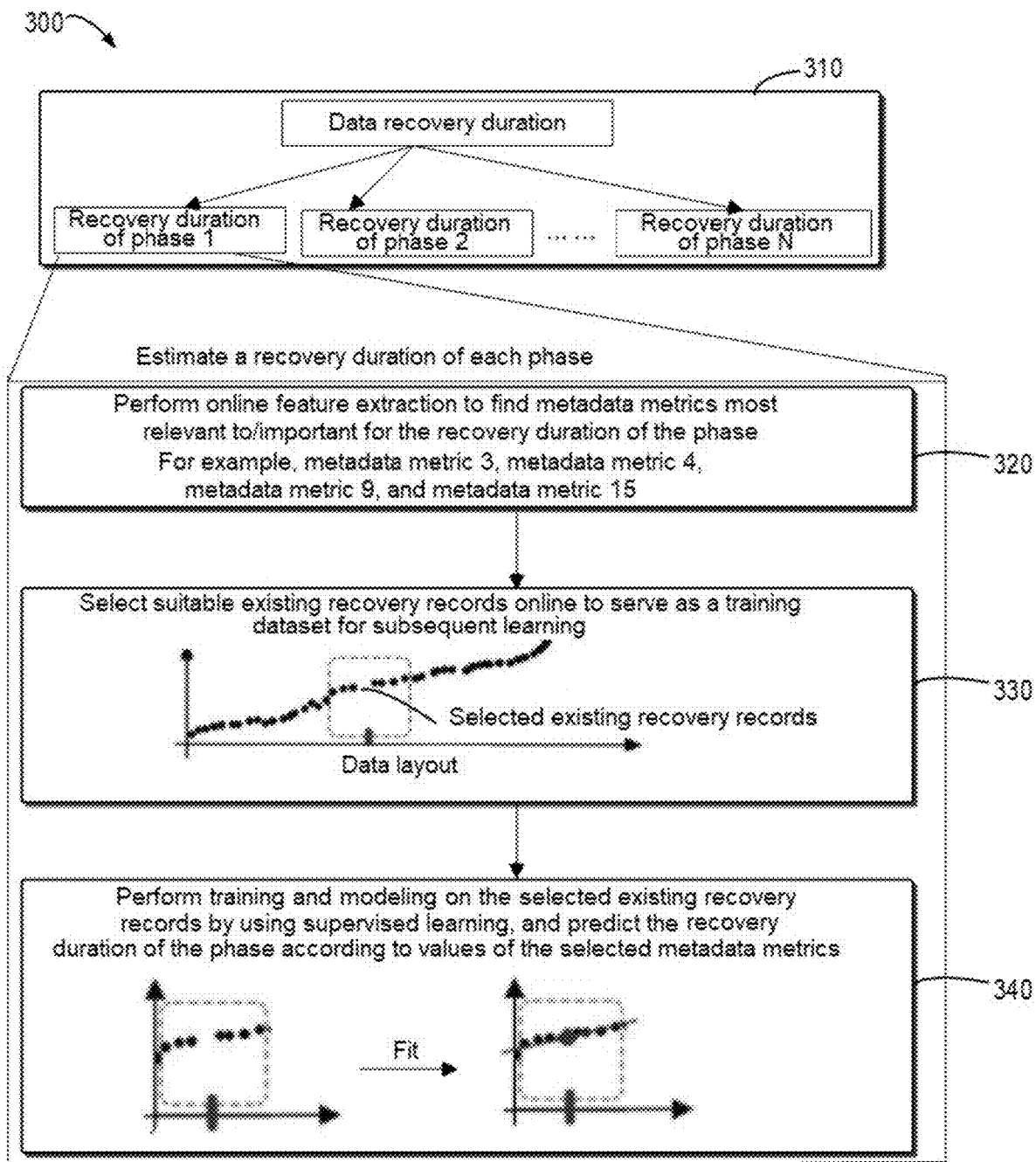
FIG. 3 shows a schematic flow chart for determining a data recovery duration according to an embodiment of the present disclosure.

FIG. 3 shows a schematic diagram of example flow 300 for determining a data recovery duration according to an embodiment of the present disclosure. FIG. 3 is illustrated with reference to FIG. 1 and FIG. 2. As shown in example flow 300 in FIG. 3, in 310, a data recovery process may be decomposed into a plurality of phases, such as phase 1, phase 2, . . . , and phase N (where N is an integer greater than 1). Each phase of the plurality of phases has its corresponding duration. The durations of these phases are added to obtain the data recovery duration corresponding to the entire data recovery process. Therefore, for each phase of the plurality of phases, the recovery duration corresponding to the phase is estimated, and then the recovery durations of these phases are added to obtain the data recovery duration.

As mentioned before, for each phase of the plurality of phases (as shown in FIG. 3, phase 1, phase 2, . . . , and phase N), the recovery duration of the phase is estimated. In the process of estimating the recovery duration of the phase (for example, phase 1), first of all, in 320, online feature extraction is performed to determine which metadata metrics are important for the recovery duration of the phase (in this embodiment, phase 1), or in other words, to determine which metadata metrics are most relevant to the recovery duration of the phase. That is, the metadata metrics most relevant to/important for the recovery duration of the phase are found.

In order to determine which metadata metrics are important for the recovery duration of the current phase (in the present embodiment, phase 1), Pearson correlation coefficients (PCCs) between various metadata metrics and the recovery duration of the current phase are first calculated based on all existing recovery records. The PCC may be used for measuring a linear correlation between each metadata metric and the recovery duration of the phase, and then determining which metadata metrics should be extracted as features for use in subsequent training.

$\rho_{P_iM_j}$ denotes a Pearson correlation coefficient between the recovery duration of the $i^{th}$ phase and the $j^{th}$ metadata metric, and is defined as follows:

$$\rho_{P_i,M_j} = \frac{\text{cov}(P_i, M_j)}{\sigma_{P_i}\sigma_{M_j}} \quad \text{(Formula 1)}$$

where $P_i$ denotes a vector of a total of recovery durations of the $i^{th}$ phase in the existing recovery records; $M_j$ denotes a vector of all values of the $j^{th}$ metadata metric in the existing recovery records; cov denotes a covariance; $\sigma^{P_i}$ denotes a standard deviation of $P_i$; and $\sigma^{M_i}$ denotes a standard deviation of Mi.

The value of the Pearson correlation coefficient $P_{piMj}$ is between −1 and +1. When it is close to zero, it indicates that the correlation between the recovery duration of the $i^{th}$ phase and the value of the $j^{th}$ metadata metric is low. The closer the value is to −1 or +1, the higher the correlation between the recovery duration of the $i^{th}$ phase and the value of the $j^{th}$ metadata metric is.

There may be a plurality of metadata metrics that are most relevant to/important for the recovery duration of a certain phase (for example, phase 1 shown in FIG. 3). In some embodiments, for example, the metadata metrics whose PCC absolute values are greater than or equal to a first threshold (for example, the first threshold may be set to 0.95, 0.9, 0.85, or any other appropriate value) may be selected as the metadata metrics most relevant to/important for the recovery duration of the phase. In some other embodiments, the number of metadata metrics that are most relevant to/important for a certain phase may be limited. For example, the number may be limited to a second threshold P, and the second threshold P is a positive integer. At this point, the PCCs of the metadata metrics related to the recovery duration of the phase may be calculated, and then are sorted according to absolute values from large to small. The first P metadata metrics are selected as the metadata metrics most relevant to/important for the recovery duration of the phase. Alternatively, the first threshold and the second threshold may also be considered at the same time to select the metadata metrics most relevant to/important for the recovery duration of the phase. In this case, the PCCs of the metadata metrics related to the recovery duration of the phase are first calculated, and then the metadata metrics corresponding to the PCCs meeting both the first threshold and the second threshold are selected as the metadata metrics most relevant to/important for the recovery duration of the phase. In some other embodiments, the PCCs between all metadata metrics and the recovery duration of the phase may be calculated and sorted according to absolute values from large to small, and then the first P metadata metrics may be selected as the metadata metrics most relevant to/important for the recovery duration of the phase. Alternatively, the first threshold and the second threshold may also be considered at the same time to select the metadata metrics. In this case, the PCCs between all the metadata metrics and the recovery duration of the phase may be first calculated, and then the metadata metrics corresponding to the PCCs meeting both the first threshold and the second threshold may be selected as the metadata metrics most relevant to/important for the recovery duration of the phase.

Figure 4A:
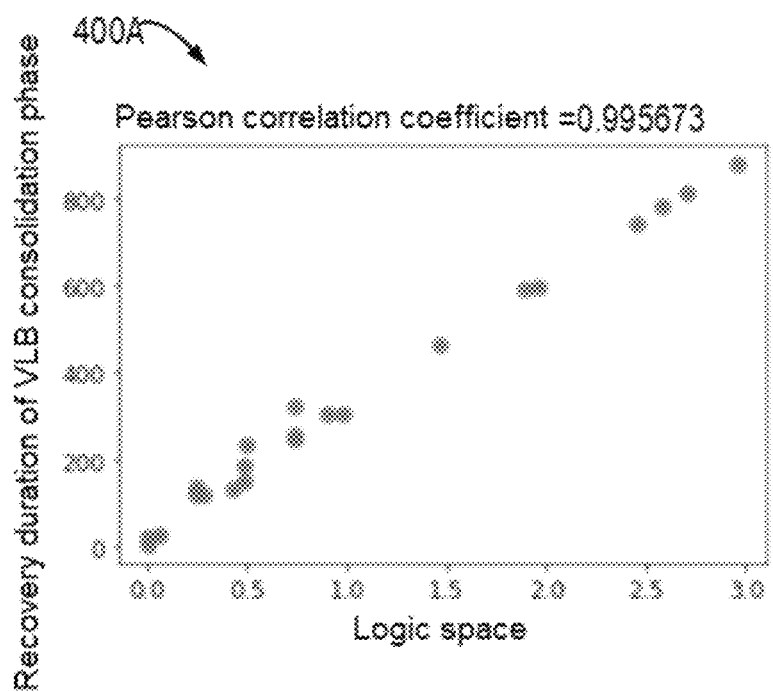
FIG. 4A shows a schematic diagram of a Pearson correlation coefficient according to an embodiment of the present disclosure.
Figure 4B:
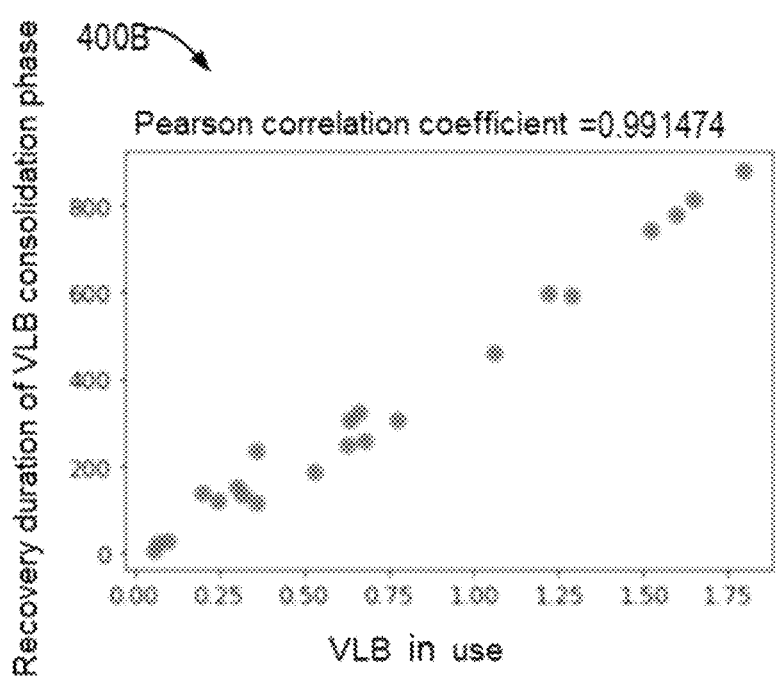
FIG. 4B shows another schematic diagram of a Pearson correlation coefficient according to an embodiment of the present disclosure.
Figure 4C:
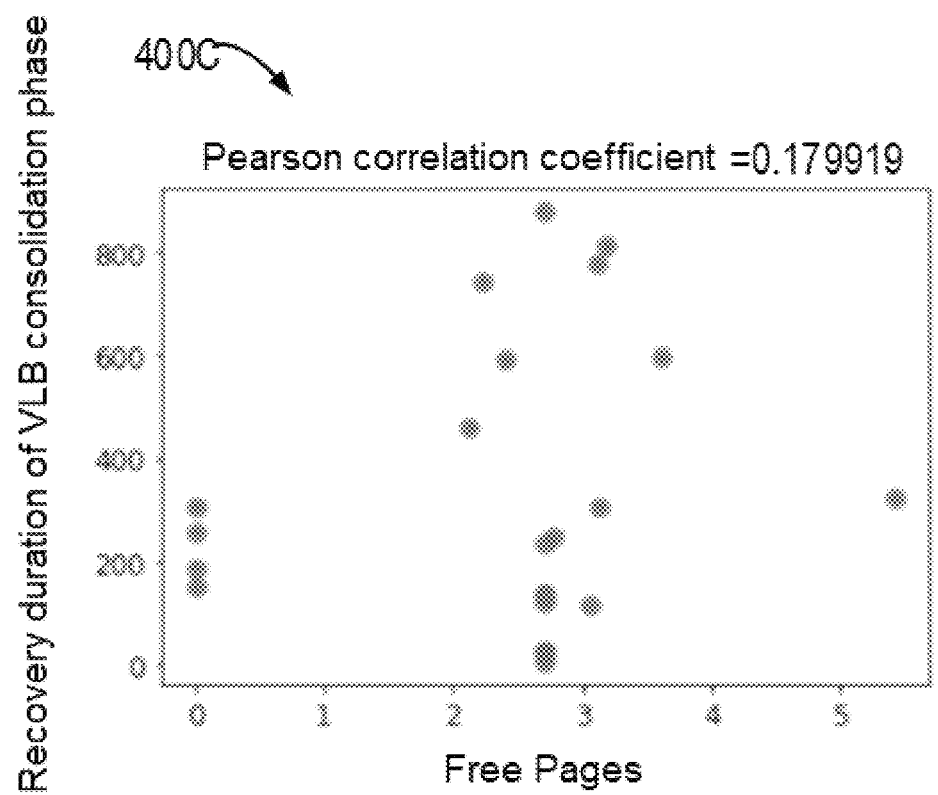
FIG. 4C shows still another schematic diagram of a Pearson correlation coefficient according to an embodiment of the present disclosure.

In some embodiments, a certain phase of data recovery of a storage apparatus, such as a "VLB consolidation" phase, is taken as an example, as shown in FIG. 4A and FIG. 4B, PCCs between the metadata metrics "logical space" and "VLB in use" and the recovery duration of the "VLB consolidation" phase are both relatively high, indicating that there is a high linear correlation between the two metadata metrics and the recovery duration of the "VLB consolidation" phase. Therefore, the two metadata metrics should be selected as important features for the "VLB consolidation" phase and added to an important feature set of the "VLB consolidation" phase. The "important feature set" is also referred to as a "metadata metric set." On the other hand, as shown in FIG. 4C, a PCC between the metadata metric "free pages" and the recovery duration of the phase is low, and there is almost no linear correlation between them. Therefore, the metadata metric "free pages" should not be added to the important feature set of the "VLB consolidation" phase. Instead, the metadata metric "free pages" should be deleted from the important feature set of the phase. For FIG. 4A, FIG. 4B, and FIG. 4C, the details will be described later.

Figure 5:
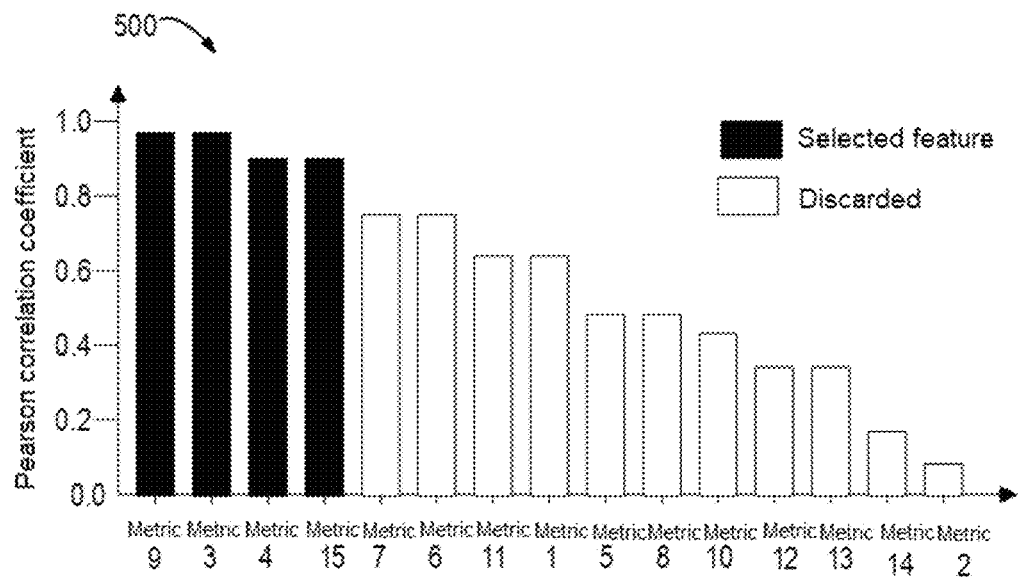
FIG. 5 shows a schematic diagram of selecting a metadata metric based on a Pearson correlation coefficient according to an embodiment of the present disclosure.

Therefore, in the estimation of each phase, metadata metrics may be selected as features according to Pearson correlation coefficients. As shown in FIG. 5, in each phase, the metadata metrics having high Pearson correlation coefficients with the recovery duration will be selected as the features of the current phase for training. Other metadata metrics having relatively low Pearson correlation coefficients will be discarded.

Returning to FIG. 3, it may be seen that through the online feature extraction of phase 1 in 320, after the selection shown in FIG. 5, metadata metric 9, metadata metric 3, metadata metric 4, and metadata metric 15 are selected as the features used in the subsequent training and added to the important feature set of phase 1. The important feature set is used for representing the layout of the data to be recovered of the phase (that is, the data layout of the phase). The advantage of online feature extraction is that it can improve the reliability and flexibility of estimation of the recovery duration. Because different metadata metrics are selected for different phases, the method can select different metadata metrics as the important features of each phase, and ensure that the selected metadata metrics are truly relevant to/important for the recovery duration. In addition, with the update of a storage apparatus version and continuous changes in the software code logic used for realizing data recovery, the online feature extraction can ensure that the metadata metrics strongly relevant to the recovery duration of the data recovery phase to be estimated can always be selected, so it is always suitable for training and will not be outdated. Therefore, the recovery duration can be estimated efficiently by selecting appropriate metadata metrics as features.

As shown in FIG. 3, in the processing of estimating the recovery duration of phase 1, after obtaining the important feature set of phase 1, in 330, appropriate existing recovery records are selected online as the training dataset for subsequent learning.

Specifically, because data layouts may vary greatly, in other words, because the values of metadata metrics representing the data layouts may also vary greatly, the software code logic for processing the recovery of metadata of different sizes may also vary greatly. Using a dataset having values of the same or similar size is better than using a dataset having large differences in size. For example, for the aforementioned metadata metric "logical space," the "logical space" is about 10 TB in the current layout, and there are existing recovery records with "logical spaces" from 1 TB to 500 TB. In this case, the existing recovery records with "logical spaces" from 1 TB to 20 TB are more suitable to be selected as a training set than recovery records with "logical spaces" from 480 TB to 500 TB. Moreover, compared with the training of the entire existing recovery records, using the existing recovery records of the same or similar size as the training dataset improves the efficiency of the subsequent training of the prediction model. For example, in the current layout, the "logical space" is about 10 TB. In this case, for example, the existing recovery records from 1 TB to 20 TB are closer to the "logical space" (as mentioned above, its size is about 10 TB) in size. Therefore, compared with the existing recovery records, for example, from 400 TB to 500 TB, the existing recovery records from TB to 20 TB may improve the accuracy of the subsequent training of the prediction model. In addition, compared with training the whole existing recovery records of the size, for example, from 1 TB to 500 TB, selecting only the existing recovery records from 1 TB to 20 TB may improve the efficiency of subsequent training of the prediction model. Based on such consideration, a linear function may be used for fitting the existing recovery records in a range of 1 TB to 20 TB. Therefore, based on the metadata metrics that are highly correlated with the recovery duration of the phase obtained by the online feature extraction in 320, a Euclidean Distance (hereinafter referred to as "Euclidean Distance") may be used in 330 for assisting in selecting a group of existing recovery records within an appropriate range of values, so as to be suitable for the subsequent training of the prediction model (for example, prediction model 112 shown in FIG. 1).

Suppose that for a specific recovery phase (for example, phase 1 shown in FIG. 3, which may be, for example, a "VLB consolidation" phase), the extracted metadata metrics are metadata metric 9, metadata metric 3, metadata metric 4, and metadata metric 15 (also see FIG. 5). The data layout of the current storage apparatus (for example, storage apparatus 120 shown in FIG. 1) may be represented by vectors of the selected metadata metrics, and the data layout of each existing recovery record may be represented by a vector containing values of the same metadata metrics. Then, according to metadata metric 9, metadata metric 3, metadata metric 4, and metadata metric 15, the Euclidean distance between the data layout of the current storage apparatus and the data layout of each existing recovery record may be calculated as:

$$\text{distance}(cm, e, m) = \sqrt{(cm_3 - e_i m_3)^2 + (cm_4 - e_i m_4)^2 + (cm_9 - e_i m_9)^2 + (cm_{15} - e_i m_{15})^2} \quad \text{(Formula 2)}$$

where, $\text{distance}(cm, eim)$ denotes the Euclidean distance between the data layout of the current storage apparatus and the data layout of the $i^{th}$ existing recovery record; $Cm$ denotes a vector containing values of the metadata metrics selected in the current storage apparatus; $eim$ denotes a vector containing values of the metadata metrics selected in the $i^{th}$ existing recovery record; $cm^3$, $Cm^4$, $cm^9$, $cm^{15}$ respectively denote values of metadata metric 3, metadata metric 4, metadata metric 9, and metadata metric 15 selected in the current storage apparatus; and $eim^3$, $eim^4$, $eim^9$, $eim^{15}$ respectively denote values of metadata metric 3, metadata metric 4, metadata metric 9, and metadata metric 15 selected in the $i^{th}$ existing recovery record.

Figure 6:
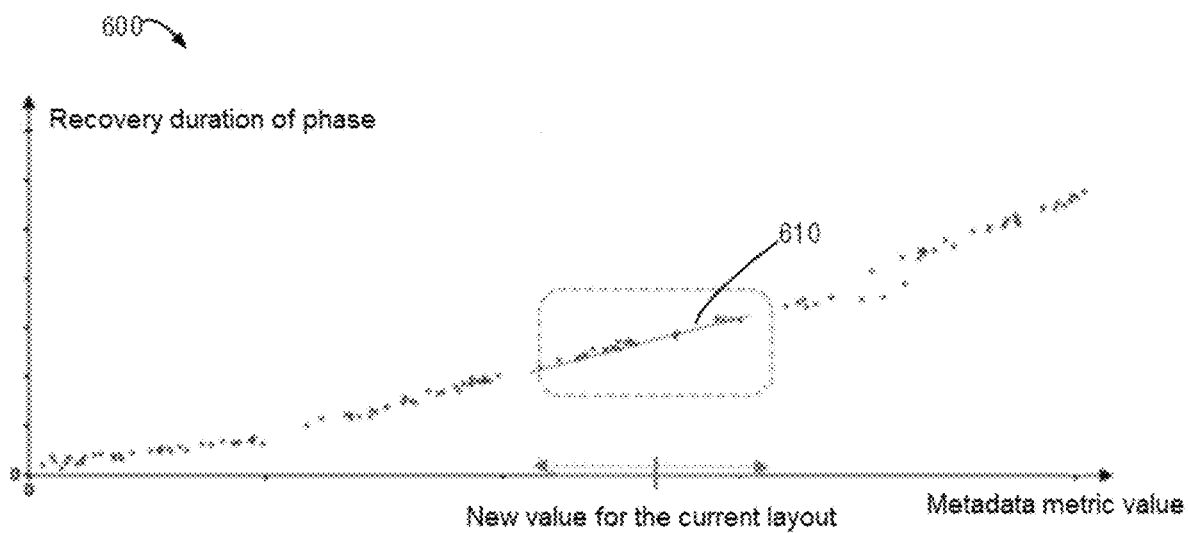
FIG. 6 shows a schematic diagram of selecting an existing recovery record based on a distance according to an embodiment of the present disclosure.

The Euclidean distance thus obtained can be used for measuring a similarity degree between the data layout of the current storage apparatus and the data layout of the $i^{th}$ existing recovery record. The smaller the Euclidean distance is, the more similar the two data layouts are. Therefore, by calculating the Euclidean distance according to the extracted metadata metrics, a group of existing recovery records that are similar to the current record or similar in size as the current record may be selected, and the existing recovery records that are far from the current record may be removed. FIG. 6 shows calculating a Euclidean distance based on a data layout, and then selecting an online training dataset according to the Euclidean distance, which will be described later with reference to FIG. 6. These existing recovery records selected in 330 will be used as a training dataset for subsequent training through supervised learning with the metadata metrics extracted in 320 above (in this case, metadata metric 9, metadata metric 3, metadata metric 4, and metadata metric 15) as features to obtain a prediction model (for example, prediction model 112 shown in FIG. 1). In some embodiments, the prediction model may be, for example, a formula used for predicting the recovery duration of the phase. The formula includes various factors (for example, metadata metrics) that affect the recovery duration of the phase and their weights and/or deviations.

As mentioned above, after the metadata metrics with high correlation with the recovery duration of the phase are selected and the appropriate existing recovery records are obtained as the training dataset, in 340, the training dataset is trained using supervised learning to obtain the prediction model (for example, prediction model 112 shown in FIG. 1). The prediction model is used for predicting the recovery duration of the phase based on the values of metadata metrics extracted in 320 above (in this case, metadata metric 9, metadata metric 3, metadata metric 4, and metadata metric 15). Specifically, for example, supervised learning may be used for training and modeling the existing recovery records (that is, the training dataset) selected, for example, in 330, fitting to obtain the prediction model (for example, prediction model 112 shown in FIG. 1), and estimating (or predicting) the recovery duration of the phase based on the values of metadata metrics in the important feature set obtained in 320. As mentioned before, after online feature extraction in 320 and online selection of appropriate existing recovery records as the training dataset in 330, the correlations between the recovery duration of the phase (phase 1 in the implementation shown in FIG. 3) and various metadata metrics as well as the most similar existing recovery records are known.

For the phase where there is no obvious linear dependency between the recovery duration of the phase and any metadata metric, a regression model may be established, and the regression model may be used for determining the recovery duration of the phase based on the existing recovery records. For example, a K-nearest neighbor (K-NN) regression method may be used for calculating an average value based on k (k is an integer greater than or equal to 1) nearest existing recovery records, and the value is used as an estimated value. Generally speaking, the recovery duration of the phase is not significant (for example, in the data recovery duration, the recovery duration of the phase has a relatively small proportion, such as less than 1%), and therefore, the estimation method is sufficient.

For the phase for which metadata metrics with high linear correlations (for example, absolute values of Pearson correlation coefficients are large) and a suitable training dataset have obtained, a linear regression model may be established by training the training dataset through supervised learning, relevant parameters of the linear regression model may be set, and the prediction or estimation of the recovery duration of the phase may be realized based on the established linear regression model.

The linear regression model may be defined as:

$$p_i = \theta_0 + \theta_1 m_1 + \theta_2 m_2 + \ldots + \theta_n m_n \quad \text{(Formula 3)}$$

where $P^i$ denotes the recovery duration of the $i^{th}$ phase of the storage apparatus (for example, storage apparatus 120 shown in FIG. 1); $n$ denotes the number of selected metadata metrics; $m^i$ denotes a value of the $i^{th}$ metadata metric selected; $\theta^1, \theta^2, \ldots, \theta^n$ denotes feature weights of the selected metadata metrics $m^1, m^2, \ldots, m^n$; and $\theta^0$ denotes a deviation.

After training, all feature weights and deviations of the selected metadata metrics may be predicted, so that a prediction model may be established (for example, prediction model 112 shown in FIG. 1), and then the prediction model may be used for determining an estimated value (or also referred to as a predicted value) of the recovery duration of the $i^d$ phase of the storage apparatus.

In one embodiment, data recovery is performed on a storage apparatus. It is assumed that a PLB VLB browsing phase, a root stripe logical browsing phase, and a VLB consolidation phase are the three most time-consuming phases. By taking the three phases as an example, for each phase, according to R (R is an appropriate integer greater than 1) metadata metrics that have a high correlation with the recovery duration, a dataset containing M (M is an appropriate integer greater than 1) existing recovery records is selected from candidate existing recovery records. Then, supervised learning is used for modeling the selected R metadata metrics and the selected M existing recovery records, so as to obtain a prediction model and an estimated value of the recovery duration of the phase. Then, the estimated values of the recovery durations of the three most time-consuming phases are added, and the estimated values of the recovery durations of other phases are further added to obtain an estimated value of the entire data recovery duration. In some other embodiments, it is also possible that after the estimated values of the recovery durations of the three most time-consuming phases are obtained, a sum of the estimated values of the recovery durations of the three phases is multiplied by a coefficient to denote the estimated value of the entire data recovery duration. In this case, for example, the coefficient may be obtained from previous experience. For example, if it is known by historical experience that the recovery durations of the three most time-consuming phases account for 80% of the total data recovery duration, after the estimated values of the recovery durations of the three most time-consuming phases are obtained, the sum of the estimated values of the recovery durations of the three phases may be multiplied by a factor of 1.25 (=1÷80%), and the calculated value may be used as the estimated value of the entire data recovery duration.

As mentioned above, the embodiments of the present disclosure use the technical idea of machine learning to provide a method of estimating a data recovery duration before data recovery. In this method, at each phase of data recovery, the recovery duration of the phase is estimated based on a current data layout, and then the recovery durations of various phases are added to obtain the data recovery duration corresponding to the entire data recovery process (the data recovery duration is an estimated value, or also referred to as a "predicted value"). When the recovery duration of each phase is estimated, first, which metadata metrics are highly relevant to/important for the recovery duration of the phase are found through online feature extraction, and then a training dataset is selected online, that is, a group of existing data recovery records suitable for the subsequent training of a fitting function is selected, and then supervised learning is used for training a prediction model and predicting the recovery duration of the phase. In this way, the situation where the data recovery duration is not known before starting data recovery and then the data recovery takes more time than previously thought to put things off can be avoided, which can help users understand how long the data unavailability may last before the data recovery starts, and help users make efficient decisions to schedule the data recovery in an appropriate time period, thereby improving the efficiency of the data recovery process and saving time of the users.

FIG. 4A shows a schematic diagram of Pearson correlation coefficient 400A according to an embodiment of the present disclosure. As shown in FIG. 4A, taking a "VLB consolidation" phase of data recovery of a storage apparatus (for example, storage apparatus 120 shown in FIG. 1) as an example, a PCC between a metadata metric "logical space" and the recovery duration of the phase is 0.995673, which is very close to 1. That is, there is a high PCC between the metadata metric "logical space" and the recovery duration of the phase, indicating that there is a high linear correlation between the metadata metric and the recovery duration of the "VLB consolidation" phase. Therefore, the metadata metric "logical space" should be selected as an important feature for the "VLB consolidation" phase and added to an important feature set of the "VLB consolidation" phase. FIG. 4B shows a schematic diagram of Pearson correlation coefficient 400B according to an embodiment of the present disclosure. As shown in FIG. 4B, also taking the "VLB consolidation" phase of the data recovery of the storage apparatus as an example, a PCC between a metadata metric "Vlb in use" and the recovery duration of the phase is 0.991474, which is also very close to 1. That is, there is a high PCC between the metadata metric "Vlb in use" and the recovery duration of the phase, indicating that there is also a high linear correlation between the metadata metric and the recovery duration of the "VLB consolidation" phase. Therefore, the metadata metric "Vlb in use" should be selected as an important feature for the "VLB consolidation" phase, and it should also be added to the important feature set of the "VLB consolidation" phase.

FIG. 4C shows a schematic diagram of Pearson correlation coefficient 400C according to an embodiment of the present disclosure. As shown in FIG. 4C, a PCC between a metadata metric "free pages" and the recovery duration of the phase is 0.179919, that is, the PCC between the metadata metric "free pages" and the recovery duration of the phase is low, and therefore, there is almost no linear correlation between the two, so the metadata metric "free pages" should not be added to the important feature set of the "VLB consolidation" phase. If the metadata metric "free pages" (for example, due to an error in processing) is already in the important feature set of the "VLB consolidation" phase, the metadata metric "free pages" should be deleted from the important feature set of the phase.

In the prediction process of each phase, the metadata metric having a high Pearson correlation coefficient with the recovery duration of the phase will be selected as the feature of the current phase for training. Other metadata metrics having relatively low Pearson correlation coefficients will be discarded. This will be illustrated below with reference to FIG. 5.

FIG. 5 shows a schematic diagram of example method 500 of selecting a metadata metric based on a Pearson correlation coefficient according to an embodiment of the present disclosure. As shown in FIG. 5, in example method 500, Pearson correlation coefficients of a total of 15 metadata metrics (from "metric 1" to "metric 15") and a certain phase are calculated, and then the 15 metadata metrics are arranged from left to right on a horizontal axis in the order of the Pearson correlation coefficients (absolute values) from large to small. For example, a first threshold may be set to 0.8 based on the Pearson correlation coefficients, and then the metadata metric whose absolute value of the Pearson correlation coefficient is greater than or equal to the first threshold is selected as the metadata metric most relevant to/important for the recovery duration of the phase. Specifically, as shown in FIG. 5, the Pearson correlation coefficients corresponding to metadata metric 9, metadata metric 3, metadata metric 4, and metadata metric 15 are greater than 0.8, and the Pearson correlation coefficients corresponding to other metadata metrics are less than 0.8. Therefore, metadata metric 9, metadata metric 3, metadata metric 4, and metadata metric 15 having relatively high Pearson correlation coefficients with the recovery duration are selected to be added to the important feature set of the current phase, and are used as features of the current phase for training. Other metadata metrics having relatively low Pearson correlation coefficients with the recovery duration of the current phase will be discarded (will not be added to the important feature set of the current phase for training as the features of the current phase).

In some other embodiments, the number of metadata metrics that are most relevant to/important for a certain phase may be limited. For example, the number may be limited to a second threshold P, and the second threshold P is a positive integer. At this point, the PCCs of the metadata metrics related to the recovery duration of the phase may be calculated, and then sorted according to absolute values from large to small. The first P metadata metrics are selected as the metadata metrics most relevant to/important for the recovery duration of the phase. For example, the second threshold P is set to 3 as shown in the figure, for metadata metric 1 to metadata metric 15 shown in FIG. 5, metadata metric 9, metadata metric 3, and metadata metric 4, which rank the top three in the Pearson correlation coefficients with the recovery duration of the current phase, are selected to be added to the important feature set of the current phase for training as the features of the current phase. Other metadata metrics will be discarded (will not be added to the important feature set of the current phase for training as the features of the current phase).

Alternatively, the first threshold and the second threshold may also be considered at the same time to select the metadata metrics most relevant to/important for the recovery duration of the current phase. In this case, the PCCs of the metadata metrics related to the recovery duration of the phase are first calculated, and then the metadata metrics corresponding to the PCCs meeting both the first threshold and the second threshold are selected as the metadata metrics most relevant to/important for the recovery duration of the phase. At this point, the PCCs of the metadata metrics related to the recovery duration of the phase may be calculated, and then sorted according to absolute values from large to small. The first P metadata metrics are selected as the metadata metrics most relevant to/important for the recovery duration of the phase. For example, if the first threshold is set to 0.8 and the second threshold P is set to 5 as shown in the figure, for metadata metric 1 to metadata metric 15 shown in FIG. 5, first of all, based on the first threshold of 0.8, 4 metadata metrics including metadata metric 9, metadata metric 3, metadata metric 4, and metadata metric 15 having Pearson correlation coefficients with the recovery duration of the current phase greater than or equal to 0.8 are selected. Then, the number (being 4) of metadata metrics selected based on the first threshold is less than the second threshold of 5, and therefore, all the 4 metadata metrics are added to the important feature set of the current phase for training as the features of the current phase. Other metadata metrics will be discarded (will not be added to the important feature set of the current phase for training as the features of the current phase).

Alternately, for example, if it is not known which metadata metrics may be relevant to the recovery duration of the phase, or if it is possible to omit metadata metrics relevant to the recovery duration of the phase, it may be possible to, instead of the calculation of the PCCs of the metadata metrics relevant to the recovery duration of the phase, calculate the PCCs between all metadata metrics and the recovery duration of the phase, then select appropriate metadata metrics from these PCCs (for example, select the appropriate metadata metrics according to the method of meeting the first threshold, the second threshold, or both) as the metadata metrics most relevant to/important for the recovery duration of the phase. In this case, a difference from the previous embodiment only lies in the calculation of PCCs of all metadata metrics and the recovery duration of the phase, but in the previous embodiment, PCCs of metadata metrics relevant to the recovery duration of the phase are calculated, and therefore, the specific method is obtained with reference to the previous embodiment, and will not be repeated here.

FIG. 6 shows a schematic diagram of example method 600 of selecting an existing recovery record based on a distance according to an embodiment of the present disclosure. In some embodiments, selecting existing recovery records based on distances may be calculating Euclidean distances based on a data layout, and then selecting the existing recovery records based on the Euclidean distances as an online training dataset of a prediction model.

As mentioned above, in the embodiment shown in FIG. 5, for the "VLB consolidation" phase, metadata metric 9, metadata metric 3, metadata metric 4, and metadata metric 15 are extracted as an important feature set. The data layout of the current storage apparatus may be represented by vectors of the selected metadata metrics, and the data layout of each existing recovery record may be represented by a vector containing values of the same metadata metrics. Therefore, a Euclidean distance between the data layout of the storage apparatus and the data layout of each existing recovery record may be calculated according to metadata metric 9, metadata metric 3, metadata metric 4, and metadata metric 15 (see the previous formula 1). The Euclidean distance thus obtained may be used for measuring a similarity degree between the data layout of the storage apparatus and the data layout of various existing recovery records. The smaller the Euclidean distance is, the more similar the two data layouts are.

Therefore, by calculating the Euclidean distance based on the extracted metadata metrics, a group of existing recovery records that are similar to the current record layout and/or similar in size as the current record layout (as shown in label 610 in FIG. 6) may be selected, and the existing recovery records whose Euclidean distance are far from the current record are removed. After the existing recovery record 610 is obtained, it may be linearly fitted, as shown in 340 in FIGS. 3 and 610 in FIG. 6. The selected existing recovery records will be used as the training dataset to train the prediction model (for example, prediction model 112 shown in FIG. 1) in subsequent supervised learning.

In this way, by selecting existing recovery records based on distances (such as Euclidean distances), existing recovery records with closer data layouts can be selected. In particular, on the basis of selecting, from the existing recovery records, existing recovery records of similar size as the training dataset, as illustrated above, existing recovery records that are closer to the data layout and more suitable for data fitting and model training, and have more accurate prediction results and higher confidence can be selected. For example, if the existing recovery records from 5 TB to 15 TB are linearly relevant to the data to be recovered, an approximate straight line can be obtained by fitting. At the same time, the existing recovery records with the size of 400 TB to 500 TB are also linearly relevant to the data to be recovered, and can also be fitted to obtain an approximate straight line with a slope higher than that of the previous one. In this case, the existing recovery records of 5 TB to 15 TB may obtain more accurate prediction results than the existing recovery records of 400 TB to 500 TB. In addition, compared with training all recovery records or all existing recovery records, using existing recovery records of the same or similar size as the training dataset improves the efficiency of subsequent training of the training dataset to obtain the prediction model. For example, compared with training the whole existing recovery records in the size, such as 1 TB to 500 TB, selecting only the existing recovery records of 1 TB to 20 TB will improve the efficiency of subsequent training of the training dataset to obtain the prediction model.

Figure 7:
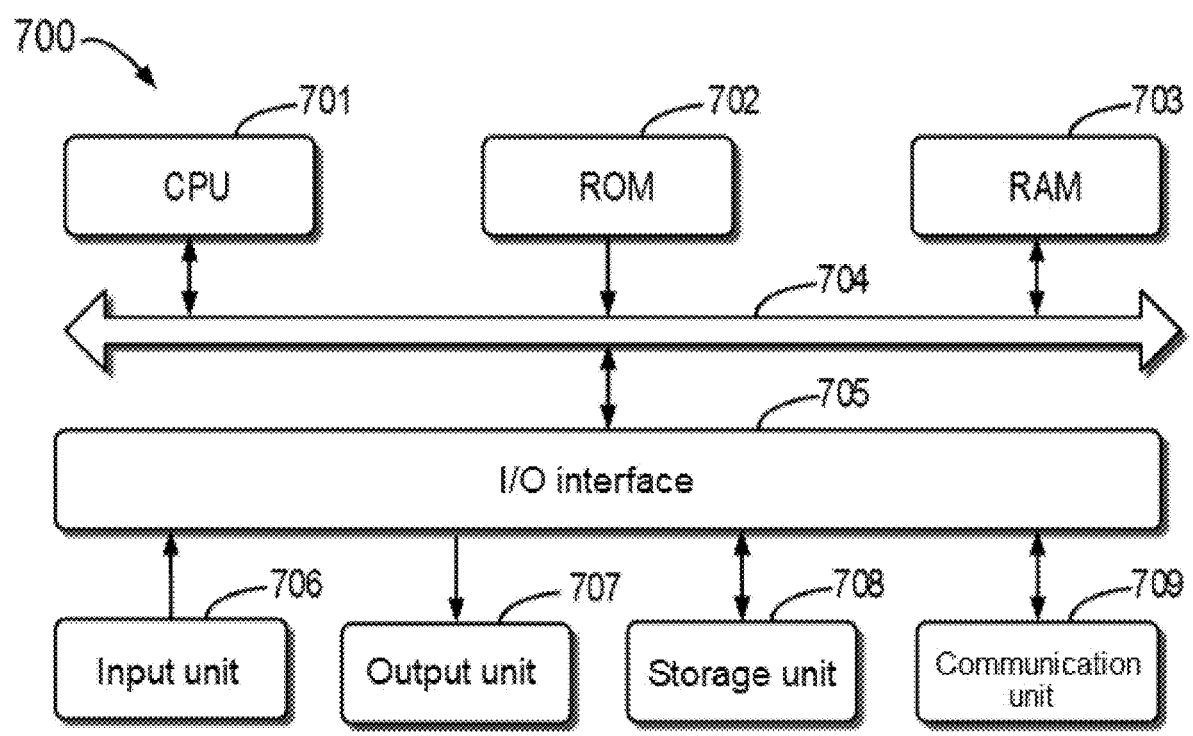
FIG. 7 shows a schematic block diagram of a device that may be used to implement an embodiment of the present disclosure.

FIG. 7 shows a schematic block diagram of device 700 that may be used to implement an embodiment of the present disclosure. Device 700 may be a device or an apparatus described in the embodiments of the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by processing unit 701. For example, in some embodiments, the method may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for determining a data recovery duration, comprising:
   determining a plurality of phases of data recovery;
   determining, based on a metadata metric set of a phase in the plurality of phases, a recovery duration of the phase, the recovery duration of the phase representing a duration required for recovery of the phase; and
   determining the data recovery duration based on the recovery duration of the phase;
   wherein the determining, based on a metadata metric set of a phase in the plurality of phases, a recovery duration of the phase comprises:
   determining the metadata metric set of the phase, a metadata metric in the metadata metric set affecting the recovery duration of the phase;
   determining, based on the metadata metric set, an existing recovery record associated with the phase of the data recovery; and
   determining, based on the existing recovery record and the metadata metric set, the recovery duration of the phase.

2. The method according to claim 1, wherein determining the metadata metric set comprises:
   determining a correlation coefficient between a metadata metric and the recovery duration of the phase;
   determining the metadata metrics corresponding to the phase based on the correlation coefficient; and
   determining the metadata metric set based on the metadata metrics.

3. The method according to claim 2, wherein determining the correlation coefficient comprises:
   calculating a Pearson correlation coefficient between the metadata metric and the recovery duration of the phase.

4. The method according to claim 2, wherein determining the metadata metric set corresponding to the phase based on the correlation coefficient comprises:
   comparing the correlation coefficient with a correlation coefficient threshold; and
   adding, in response to that an absolute value of the correlation coefficient is greater than or equal to the correlation coefficient threshold, the metadata metric corresponding to the correlation coefficient to the metadata metric set corresponding to the phase.

5. The method according to claim 4, further comprising:
   deleting, from the metadata metric set corresponding to the phase, metadata metrics corresponding to the correlation coefficients less than the correlation coefficient threshold.

6. The method according to claim 1, wherein determining the existing recovery record comprises:
   calculating a Euclidean distance between the metadata metric in the metadata metric set of data to be recovered and the metadata metric of a candidate existing recovery record; and
   determining, based on the Euclidean distance, the candidate existing recovery record as the existing recovery record.

7. The method according to claim 6, wherein determining, based on the Euclidean distance, the candidate existing recovery record as the existing recovery record comprises:
   comparing the Euclidean distance with a distance threshold; and
   determining, in response to the Euclidean distance being less than the distance threshold, the candidate existing recovery record as the existing recovery record.

8. The method according to claim 1, wherein determining, based on the existing recovery record and the metadata metric set, the recovery duration of the phase comprises at least one of the following:
   determining, based on a nonlinear correlation between the existing recovery record and the metadata metric in the metadata metric set, the recovery duration of the phase by using a regression model based on a plurality of existing recovery records; and determining, based on a linear correlation between the existing recovery record and the metadata metric in the metadata metric set, the recovery duration of the phase by using a linear regression model.

9. The method according to claim 1, wherein determining the data recovery duration based on the recovery duration of the phase comprises:
determining a total value of recovery durations of phases of the plurality of phases as the data recovery duration.

10. The method according to claim 1, wherein determining, based on the existing recovery record and the metadata metric set, the recovery duration of the phase comprises:
determining a weight and a deviation of the metadata metric in the metadata metric set of the data to be recovered; and
determining the recovery duration of the phase based on the weight and the deviation of the metadata metric.

11. The method according to claim 1, wherein the recovery duration of the phase is determined by using supervised learning,
wherein determining, based on the existing recovery record and the metadata metric set, the recovery duration of the phase comprises: obtaining a prediction model by using the existing recovery record as a training dataset and using the metadata metrics in the metadata metric set as features to perform supervised learning, and determining the recovery duration of the phase by the prediction model based on the metadata metric set.

12. The method according to claim 1, further comprising:
after determining the data recovery duration based on the recovery duration of the phase, scheduling initiation of the data recovery based on the data recovery duration.

13. The method according to claim 12, further comprising:
after scheduling initiation of the data recovery, initiating the data recovery.

14. An electronic device, comprising:
a processing unit; and
a memory coupled to the processing unit and storing instructions, wherein the instructions, when executed by the processing unit, perform the following actions:
determining a plurality of phases of data recovery;
determining, based on a metadata metric set of a phase in the plurality of phases, a recovery duration of the phase, the recovery duration of the phase representing a duration required for recovery of the phase; and
determining the data recovery duration based on the recovery duration of the phase;
wherein the determining, based on a metadata metric set of a phase in the plurality of phases, a recovery duration of the phase comprises:
determining the metadata metric set of the phase, a metadata metric in the metadata metric set affecting the recovery duration of the phase;
determining, based on the metadata metric set, an existing recovery record associated with the phase of the data recovery; and
determining, based on the existing recovery record and the metadata metric set, the recovery duration of the phase.

15. The device according to claim 14, wherein determining the metadata metric set comprises:

determining a correlation coefficient between a metadata metric and the recovery duration of the phase;
determining the metadata metrics corresponding to the phase based on the correlation coefficient; and
determining the metadata metric set based on the metadata metrics.

16. The device according to claim 15, wherein determining the correlation coefficient comprises:
calculating a Pearson correlation coefficient between the metadata metric and the recovery duration of the phase.

17. The device according to claim 15, wherein determining the metadata metric set corresponding to the phase based on the correlation coefficient comprises:
comparing the correlation coefficient with a correlation coefficient threshold; and
adding, in response to that an absolute value of the correlation coefficient is greater than or equal to the correlation coefficient threshold, the metadata metric corresponding to the correlation coefficient to the metadata metric set corresponding to the phase.

18. The device according to claim 17, wherein when executed by the processing unit, the instructions further perform the following action:
deleting, from the metadata metric set corresponding to the phase, metadata metrics corresponding to the correlation coefficients less than the correlation coefficient threshold.

19. The device according to claim 14, wherein determining the existing recovery record comprises:
calculating a Euclidean distance between the metadata metric in the metadata metric set of data to be recovered and the metadata metric of a candidate existing recovery record; and
determining, based on the Euclidean distance, the candidate existing recovery record as the existing recovery record.

20. A computer program product having a non-transitory computer readable medium which stores a set of instructions to determine a data recovery duration; the set of instructions, when carried out by computerized circuitry, causing the computerized circuitry to perform a method of:
determining a plurality of phases of data recovery;
determining, based on a metadata metric set of a phase in the plurality of phases, a recovery duration of the phase, the recovery duration of the phase representing a duration required for recovery of the phase; and
determining the data recovery duration based on the recovery duration of the phase;
wherein the determining, based on a metadata metric set of a phase in the plurality of phases, a recovery duration of the phase comprises:
determining the metadata metric set of the phase, a metadata metric in the metadata metric set affecting the recovery duration of the phase;
determining, based on the metadata metric set, an existing recovery record associated with the phase of the data recovery; and
determining, based on the existing recovery record and the metadata metric set, the recovery duration of the phase.

* * * * *